United States Patent [19]

Mesnel

[11] 4,374,880
[45] Feb. 22, 1983

[54] SEALING STRIP

[75] Inventor: Francois Mesnel, Neuilly-sur-Seine, France

[73] Assignee: Etablissements Mesnel, Carrieres-sur-Sein, France

[21] Appl. No.: 200,149

[22] Filed: Oct. 24, 1980

[30] Foreign Application Priority Data

Nov. 13, 1979 [FR] France ................................. 79 27876

[51] Int. Cl.³ .............................................. E06B 7/16
[52] U.S. Cl. ...................................... 428/36; 428/43; 428/122; 49/491; 49/498; 52/716
[58] Field of Search ...................... 428/83, 122, 81, 43, 428/36, 358, 192; 49/479, 490, 491, 497, 498; 52/716–718

[56] References Cited

U.S. PATENT DOCUMENTS 2,017,556 10/1935 Westrope ............................ 428/122
2,899,720 8/1959 Vollmer ................................ 49/479
4,119,325 10/1978 Oakley et al. .................... 277/207 R

FOREIGN PATENT DOCUMENTS 1816326 7/1970 Fed. Rep. of Germany .
2609498 9/1977 Fed. Rep. of Germany .
472567 6/1969 Switzerland .

Primary Examiner—George F. Lesmes
Assistant Examiner—Alexander S. Thomas
Attorney, Agent, or Firm—Schwartz, Jeffery, Schwaab, Mack, Blumenthal & Koch

[57] ABSTRACT

A sealing strip, for use, for example, in sealing a gap between a vehicle's door and its surrounding framework, particularly along that part of its length which is curved. The sealing strip has between its U-shaped mounting portion and its tubular sealing portion a reinforcing strip which is integrally moulded with the sealing and prevents deformation of the sealing portion along that part of the sealing strip which is curved.

1 Claim, 16 Drawing Figures

U.S. Patent  Feb. 22, 1983  Sheet 1 of 2  4,374,880
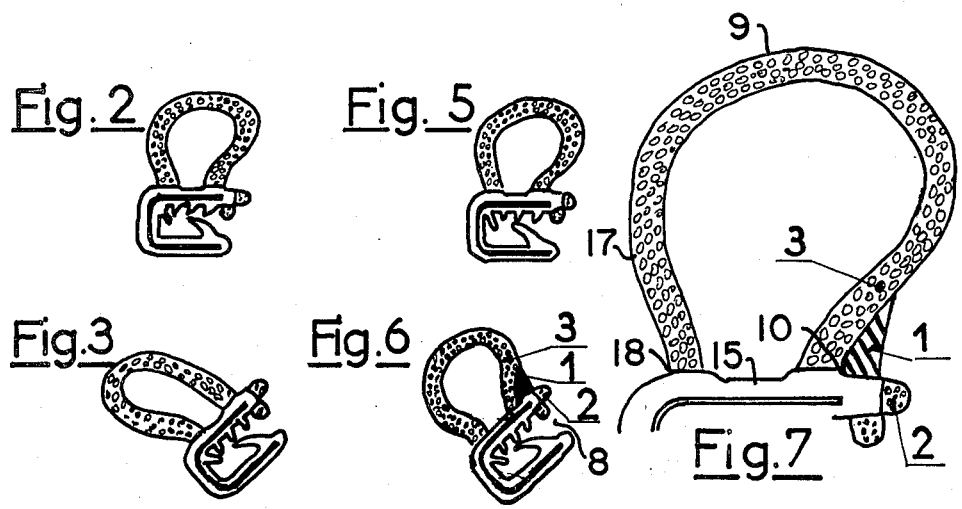
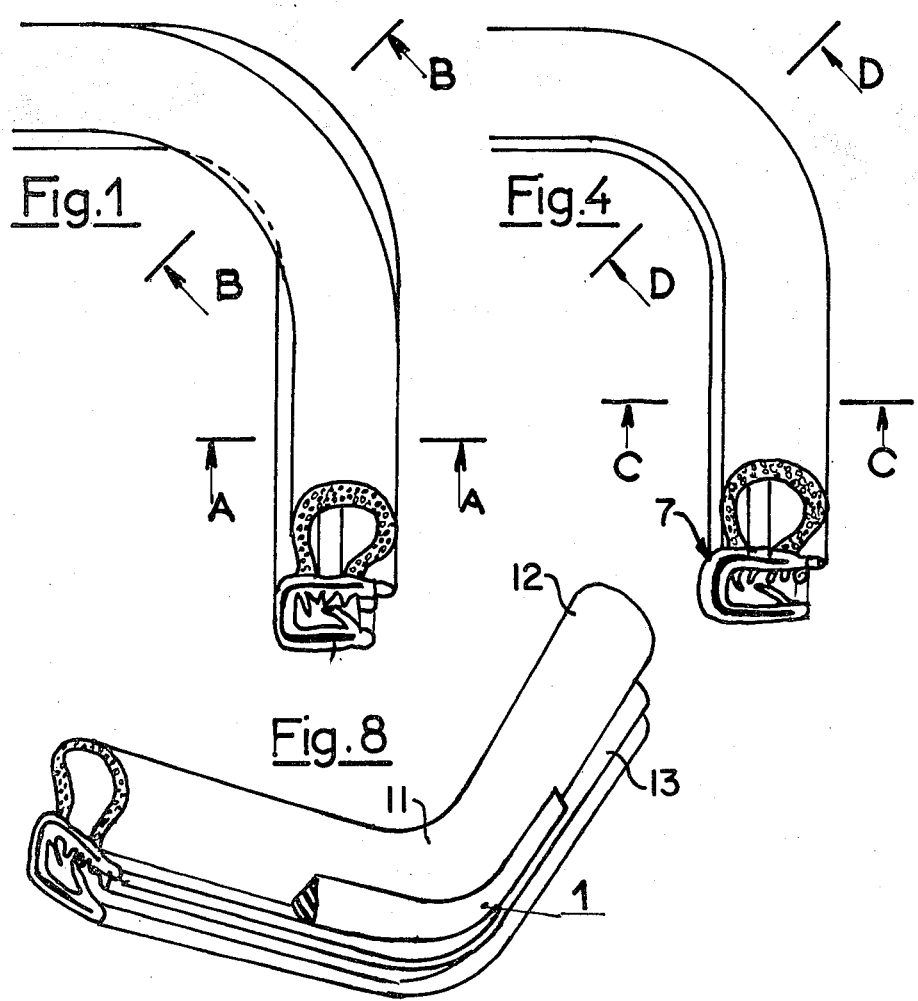

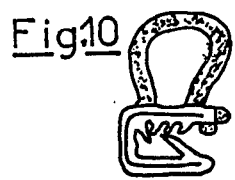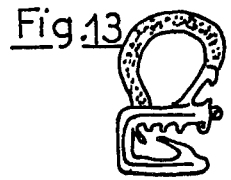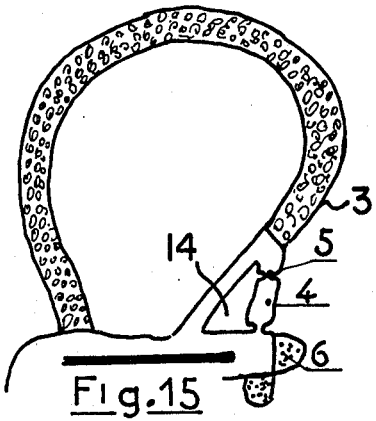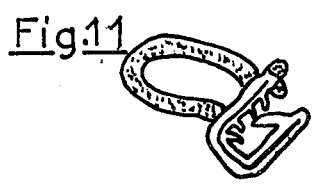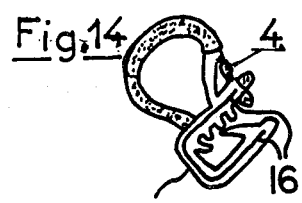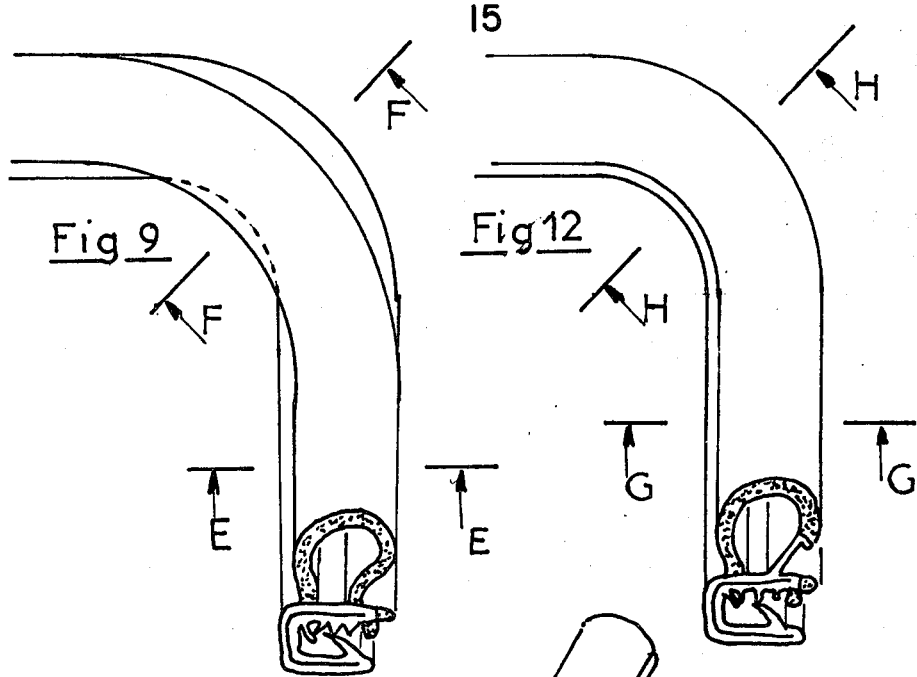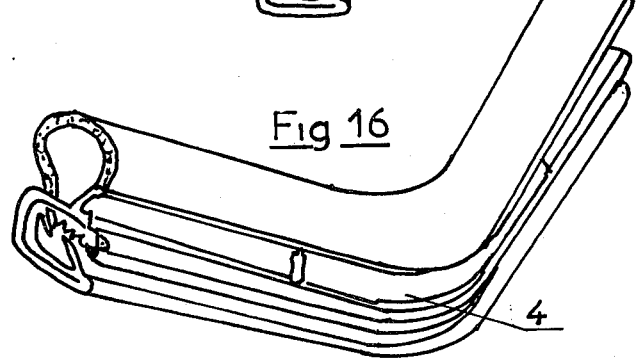

SEALING STRIP

This invention concerns the strengthening of sealing strips for use on vehicles.

Various means are known of strengthening sealing strips of the composite type combining therefore, by adhesion or by simultaneous extrusion, a substantially U-shaped mounting portion, comprising a central metal core in order to effect securing of the mounting portion to the vehicle's framework, and a sealing portion of resilient cellular rubber and of a substanially tubular shape in order to be both much more flexible and to provide an effective seal between the framework and, for example, the vehicles door. The known means of strengthening sealing strips have remained difficult and burdensome to implement, particularly in those cases where they are to be used on vehicle frameworks having flanges with a small radius of curvature without the flexible sealing portion becoming deformed, which is not only non-aesthetic, but also of a nature such as to prejudice effective sealing.

An object of the invention is to simplify and render more economical this strengthening of sealing strips and, at the same time, provide a more effective joint.

With this object in view the present invention is a sealing strip, more especially for use on vehicle doors, comprising a "U"-shaped mounting portion, consisting of a central metal core, and a cellular resilient sealing portion characterised in that a lateral connection bracing between the mounting portion and the sealing portion prevents deformation of the sealing portion in said sealing strips curved regions.

In a preferred embodiment there is provided a sealing strip, more particularly for use on vehicle doors, comprising: a U-shaped mounting portion; an essentially tubular resilient sealing portion secured to and along one leg of said U-shaped portion, said sealing portion having one longitudinal edge thereof bending towards and being secured to said one leg of said U-shaped portion at a distance from the free end of said one leg, and lateral connection bracing means joining a length at least of said longitudinal edge and of said free end to prevent deformation of said sealing portion in a curved region of said sealing strip.

Embodiments of the invention will now be described, by way of example, with reference to the accompanying drawings in which:

FIG. 1 is a perspective view of part of a conventional "tri-component" sealing strip;

FIG. 2 is a cross-section taken on the line A—A of FIG. 1;

FIG. 3 is a cross-section taken on the line B—B of FIG. 1;

FIG. 4 is a perspective view of part of a first preferred embodiment of the sealing strip of the invention;

FIG. 5 is a cross-section taken on the line C—C of FIG. 4;

FIG. 6 is a cross-section taken on the line D—D of FIG. 4;

FIG. 7 is a cross-section similar to FIG. 6 but on an enlarged scale;

FIG. 8 is a perspective view of part of the embodiment of FIGS. 4 to 7;

FIG. 9 is a perspective view of part of a conventional tri-component sealing strip;

FIG. 10 is a cross-section taken on the line E—E of FIG. 9;

FIG. 11 is a cross-section taken on the line F—F of FIG. 9;

FIG. 12 is a perspective view of part of a second preferred embodiment of the sealing strip of the invention;

FIG. 13 is a cross-section taken on the line G—G of FIG. 12;

FIG. 14 is a cross-section taken on the line H—H of FIG. 12;

FIG. 15 is a cross-section similar to FIG. 14 but on an enlarged scale;

FIG. 16 is a further perspective view of part of the embodiment of FIGS. 12 to 14.

In FIGS. 1 to 3 a conventional sealing strip, of the so-called "bi-component" or "tri-component" type, comprises a U-shaped mounting portion and a tubular sealing portion. The sealing strip is shown in the configuration which it adopts when it is secured along an edge of a vehicle door frame (not shown). The sealing portion, which is more flexible than the mounting portion, is deformed in the region where the sealing strip is curved, in a manner as shown in FIG. 3. On the other hand its straight sections remain normal and underformed as is shown in FIG. 2.

To avoid this deformation, with a first preferred embodiment of the sealing strip of the invention, as illustrated in FIGS. 4 to 8, there is effected in advance, at a predetermined location on the curved region a reinforcing overmoulding 1, which provides a connection bracing between free end 2 of a limb of the mounting portion and one side 3 of the cellular sealing portion. This connection bracing greatly strengthens the sealing strip and prevents deformation of the sealing portion in the curved region of the sealing strip.

This short reinforcing overmoulding 1 is effected in a suitable mould, by injection of a thermoplastic polyurethane resin, after coating of the mounting portion and the sealing portion in the curved region with a primary solution, or undercoat, of polyurethane having an isocyanate reactive grouping for adherence of the thermoplastic. Alternatively this injection moulding is effected, without this prior coating, by then using a thermoplastic which is directly compatible with the material of the sealing strip, on condition that the sealing strip be scrupulously clean.

Some structural features of the embodiment of FIGS. 4–8 will now be described, all of which are obvious from the drawing and implicit from the preceding description. The sealing strip includes an elongated mounting portion 7 having a profile shaped as a "U" in a cross section taken transverse to the length of the mounting portion, the U of the profile having an open side 8 for engagement with part of the vehicle. There is an elongated resilient sealing portion 9 joined with the elongated mounting portion at a joint 10, the mounting portion, sealing portion and joint therebetween all running lengthwise along substantially the same path. The sealing and mounting portions have at least one curved segment 11 for cooperation with a curved portion of the vehicle and at least one relatively straight segment 12 for cooperation with a relatively straight portion of the vehicle. The lateral connection bracing 1 is elongated and extends laterally between the mounting portion and the sealing portion in the region of the joint between the mounting and sealing portions and is located on the same side of the mounting portion as the open side of the "U" which defines the cross sectional profile thereof. The bracing extends lengthwise partially along the lengths of the mounting and sealing portions and is located along at least the curved segment of the sealing and mounting portions. This bracing, when taken in a direction along the entire length of the sealing and mounting portions, has at least one gap 13 therein with respect to the entire length of the sealing and mounting portions, this gap being located in the relatively straight segment of the sealing and mounting portions.

In FIGS. 12 to 16 there is shown a second preferred embodiment of the sealing strip of the invention. In this embodiment, however, the reinforcing overmoulding or connection bracing is effected in a continuous manner along the entire length of the mounting portion upon its extrusion. It will be seen that the reinforcing overmoulding, which is in the form of a longitudinally extending lateral strip 4, is connected between two parts of the mounting portion, since part of the mounting portion forms part of one end of the sealing portion. The strip 4 has portions of reduced cross-section 5 and 6 to facilitate detachment of the strip 4 from the mounting portion in those regions where its connection is not necessary, nor even useful, as is shown by FIGS. 13 and 16.

To again state what is obvious from the drawing and implicit from the foregoing, it will be seen that the sealing portion is essentially tubular in construction and that this construction results in the sealing portion having a part which bows outwardly of the sealing strip to form a recess 14 (FIG. 15) in the region where the sealing portion joins the mounting portion, i.e., in the region of the joint 10 (FIG. 1). It will be seen from the drawing that the bracing is disposed in this recess and that, in both embodiments, the bracing is at the exterior of both the sealing and mounting portions. It will also be seen that the mounting portion has a closed side 15 opposite the open side 8 and two legs 16 (FIG. 14) extending from the closed side toward the open side, each leg having a free end 2 adjacent the open side. It will further be seen that the sealing portion is secured to and along one of these legs of the sealing portion. The sealing portion also has a first part 17 which terminates in a first longitudinal edge 18 (FIG. 7) secured to the one leg at a position adjacent the closed side and a second part 3 which terminates in a second longitudinal edge secured to the leg at a position remote from the closed side and yet spaced from the free end of the one leg. Finally, it will be seen that the bracing extends from part of the mounting portion adjacent the free end of the one leg to the second part 3 of the sealing portion.

The invention is not restricted to the two embodiments described and shown. For example, the lateral connection bracing may be formed by a simple gluing together of opposed faces of the mounting portion and of the sealing portion in the curved region of the sealing strip.

I claim:

1. A sealing strip for use with a part of a vehicle, such as a door, the strip comprising:

(a) an elongated mounting portion having an exterior and having a profile shaped as a "U" in a cross section taken transverse to the length of said mounting portion, the "U" of the profile having an open side for engagement with part of the vehicle, a closed side opposite said open side, and two legs extending from said closed side toward said open side, each leg having a free end adjacent said open side;

(b) an essentially tubular, elongated, resilient sealing portion joined with said elongated mounting portion, said mounting and sealing portions both running lengthwise along substantially the same path, said sealing portion being secured to and along one of said legs of said mounting portion, said sealing portion having an exterior, said sealing portion also having a first part which terminates in a first longitudinal edge secured to said one leg at a position adjacent to said closed side and a second part which terminates in a second longitudinal edge secured to said one leg at a position remote from said closed side and yet spaced from said free end of said one leg;

(c) said sealing and mounting portions having at least one curved segment for cooperation with a curved portion of the vehicle and at least one relatively straight segment for cooperation with a relatively straight portion of the vehicle;

(d) an elongated lateral connection bracing at the exteriors of said mounting and sealing portions and extending laterally from a part of said mounting portion adjacent the free end of said one leg to the second part of said sealing portion, said bracing being located on the same side of said mounting portion as said open side of said "U" which defines said cross-sectional profile thereof; said bracing extending lengthwise partially along the lengths of said mounting and sealing portions; said bracing being located along at least said curved segment of said sealing and mounting portions, said bracing, when taken in a direction along the entire length of said sealing and mounting portions, having at least one gap therein with respect to the entire length of said sealing and mounting portions, said gap being located in said relatively straight segment of said sealing and mounting portions;

(e) said bracing comprising a connection arm running longitudinally and extending between said one leg and said tubular sealing portion, said arm including, as a portion thereof, a lateral strip running longitudinally and having spaced weakened longitudinally running sides for breaking segments of said lateral strip away from said arm to effect lengthwise discontinuities in said bracing; and (f) whereby, in practice, undue deformation of said sealing portion in said curved segments is prevented.

* * * * *